(12) United States Patent
Ernst et al.

(10) Patent No.: US 6,225,477 B1
(45) Date of Patent: May 1, 2001

(54) PROCESS FOR REGENERATION OF CARBON-SUPPORTED, RHENIUM-CONTAINING CATALYSTS

(75) Inventors: Richard Edward Ernst, Kennett Square; John Byrne Michel, West Chester, both of PA (US); Daniel Campos, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/018,823

(22) Filed: Feb. 4, 1998

Related U.S. Application Data

(60) Provisional application No. 60/036,871, filed on Feb. 5, 1997.

(51) Int. Cl.[7] .................. C07D 307/56; C07D 305/00; B01J 38/48; B01J 23/06; B01J 23/42
(52) U.S. Cl. .................. 549/325; 549/326; 549/508; 502/22; 502/153; 502/183; 502/325; 502/339
(58) Field of Search .................. 549/508, 325, 549/326; 502/22, 153, 183, 325, 339

(56) References Cited

U.S. PATENT DOCUMENTS 4,550,185 * 10/1985 Mabry et al. .................. 549/508
4,609,636 * 9/1986 Mabry et al. .................. 502/183

OTHER PUBLICATIONS

Takashi et al, Chemical abstract vol. 126 No. 225027, Hydragenation of carboxylic acids by using supported polladium–rhenium catalysts, Jan. 28, 1997.*

Davenport et al, Chemical Abstract vol. 70 No. 6855, Advances in rhenium catalysts, 1968.*

* cited by examiner

Primary Examiner—John Kight
Assistant Examiner—Raymond Covington

(57) ABSTRACT

This invention relates to a method of improving the catalytic performance of palladium or ruthenium, rhenium-on-carbon hydrogenation catalysts operating in aqueous media where loss of soluble rhenium may result in rapid catalytic failure. A rhenium-containing hydrogenation catalyst comprised of rhenium on a support material is regenerated by first treating the catalyst with aqueous perrhenic acid or potassium perrhenate followed by treating the catalyst under reducing conditions at elevated temperature and pressure. Treatment of the catalyst as described replenishes dispersed fresh finely divided rhenium which enhances the activity of the catalyst while at the same time allowing the operations to be carried out in situ in the hydrogenation reactor or in a side stream reactor with significant savings in reducing reactor down time and precious metal expenses.

10 Claims, No Drawings

PROCESS FOR REGENERATION OF CARBON-SUPPORTED, RHENIUM-CONTAINING CATALYSTS

CROSS-REFERENCE TO RELATED APPLICATIONS

Applicants claim the benefit of priority to provisional application 60/036,871 filed Feb. 5, 1997.

BACKGROUND OF THE INVENTION

1. Field of the invention:

This invention relates to a method of improving the catalytic performance (i.e., sustaining and/or regenerating catalytic activity) of a carbon-supported, rhenium-containing catalyst and, in particular, a hydrogenation catalyst comprising a composite of palladium or ruthenium in combination with rhenium on a support of activated carbon. More specifically but not by way of limitation, this invention pertains to depositing and/or replenishing rhenium metal on bimetallic palladium and rhenium or ruthenium and rhenium on carbon support (i.e., Pd,Re/C or Ru,Re/C, respectively) catalysts or catalyst precursor by depositing fresh fmely divided rhenium metal on these catalysts during hydrogenation of maleic acid to tetrahydrofuran and/or 1,4-butanediol.

2. Description of the related art:

Supported rhenium containing catalysts are well known in the art and are useful in a number of important processes. Such catalysts include: palladium, rhenium/carbon catalysts and ruthenium, rhenium/carbon catalysts used in the hydrogenation of maleic acid to tetrahydrofuran; platinum; rhenium/alumina catalysts used in reforming of oil to gasoline; and rhenium on alumina catalyst used in olefin metathesis. During use of such catalysts, the catalytic activity of the catalyst can decrease over time as the rhenium component of the catalyst assumes a catalytically less active form.

There are many patents relating to the art of converting maleic acid or maleic anhydride or a variety of hydrogenatable precursors such as fumaric acid, succinic acid (SAC), maleic acid (MAC), dimethyl succinate, gamma-butyrolactone (GBL) or mixtures thereof to tetrahydrofuran (THF) and 1,4-butanediol (BDO) by catalytic hydrogenation. Of particular importance, U.S. Pat. No. 4,609,636 describes the preparation and use of a catalyst composite comprising palladium and rhenium on a carbon support for manufacture of THF, BDO or mixtures thereof from a variety of hydrogenatable precursors. This patent also cites patents that attempt to maximize product yields. Similarly, U.S. Pat. No. 5,418,952 describes the preparation and use of a catalyst composite comprising ruthenium and rhenium on a carbon support for the same use.

The catalysts of U.S. Pat. No. 4,609,636 and U.S. Pat. No. 4,550,185 are composites of palladium and rhenium on a carbon support, the composite comprising about 0.5% to 10% palladium and about 1% to 10% of rhenium by total weight, the palladium being present in the form of crystallites having an average size of about 10 nm to 25 nm and the rhenium being in the form of a highly dispersed phase of crystallites having an average size of less than about 2.5 nm. These catalysts are closely related to the catalyst of the present invention.

Also pertinent is a report by H. Smith Broadbent reported in Annals of the New York Academy of Sciences, 145 (1) (1967) (pages 68 through 71), which is a comprehensive study of "Rhenium and Its Compounds as Hydrogenation Catalysts". Broadbent teaches (page 62, last paragraph) in-situ preparation of an insoluble rhenium black by addition of rhenium heptoxide to a reducible organic substrate, with or without added solvent, followed by a hydrogenation step. Broadbent indicates the rhenium black is some form of Re(II), probably a hydrated monoxide. This catalyst, although less active than nickel or platinum metal hydrogenation catalysts for hydrogenation of most compounds, was judged superior to all other catalysts except, perhaps, other oxides of rhenium, for hydrogenation of carboxylic acids.

BRIEF SUMMARY OF THE INVENTION

It has now been found that the loss of catalytic activity in a Pd, Re/C catalyst and Ru, Re/C catalyst used in hydrogenation of maleic acid to tetrahydrofuran and/or 1,4-butanediol is mechanistically associated with agglomeration of the rhenium component of the catalyst as well as the direct loss of rhenium by dissolution. One object of the invention is thus to treat the catalyst in a manner which deposits fresh rhenium in a catalytically active form.

The catalytic activity of a rhenium-containing supported catalyst, most preferably either a Pd, Re/carbon or Ru, Re/carbon-supported hydrogenation catalyst, is enhanced by treatment of the catalyst with a water-soluble perrhenate (such as perrhenic acid, $HReO_4$), followed by further treatment of the catalyst in a reducing atmosphere at elevated temperature and pressure prior to or while in use. This process has been found to enhance the activity of freshly-prepared, carbon-supported Pd, Re catalysts in the hydrogenation of maleic acid to THF/BDO, and to increase the activity of used or deactivated catalysts.

Treatment with soluble perrhenate as disclosed may be carried out after a fresh catalyst has been prepared, or after the catalyst has been used. The catalytic activity of the fresh or used-but-still-active catalyst is enhanced, the activity of the deactivated catalyst can be either restored to its fresh state (i.e., the activity it exhibited after initial startup) or enhanced further. The extent of the desired boost in catalytic performance will determine the amount of $HReO_4$ to be added. We have found in the hydrogenation of maleic acid that the performance is boosted 70 to 100 STY units per weight % Re added in favorable cases.

Space time yield, STY, for purposes of this invention is defined as follows:

STY={g/hr THF liq+g/hr THF gas}/kilogram of catalyst

Selectivity is defined as follows:

Selectivity={moles/hr product}/{moles/hr product and byproduct} or

Selectivity={moles/hr THF gas+THF liq+GBL liq+BDO liq}/
{moles/hr THF gas+THF liq+GBL liq+BDO liq+PrOH liq+
BuOH liq+alkane gas} where GBL is gamma-butyrolactone, BDO is 1,4-butanediol, PrOH is n-propyl alcohol, BuOH is n-butyl alcohol, and alkane is methane, ethane, propane, and butane. NOTE: Only insignificant amounts of GBL and BDO are present in the gas phase. Mass balance expressed as a percentage is defined for purposes of this invention as 100 times the millimoles per hour of products recovered divided by the millimoles per hour of MAC being fed.

The added $HReO_4$ is then reduced by treatment with hydrogen at elevated temperature and pressure and deposited onto the support material in a highly dispersed, catalytically active form. The treatment with hydrogen at elevated temperature and pressure can be performed immediately prior to introduction of the substrate (maleic acid) feed or, alternatively, under true working conditions; i.e. concurrently while the maleic acid substrate is being fed and hydrogenated to THF.

Another embodiment of the invention is related to the finding that exposure of fresh Pd, Re/C catalyst-HReO$_4$—H$_2$O slurry to flowing hydrogen at 2,000 psig (1.38×10$^7$ Pa) and ambient temperatures for approximately 8 hours (low temperature activation) prior to elevating the temperature (as above) provides additional performance enhancement.

Surprising features of this invention in light of the art are that:

1) Fresh catalysts prepared by rhenium deposition in water perform as well as palladium, rhenium-on-carbon catalysts prepared before introduction into the reactor, thus eliminating the usual rhenium impregnation, drying, and reduction steps. Those skilled in the art will appreciate that this offers advantages to the catalyst user of flexibility in catalyst choice (a large variety of "off-the-shelf" Pd/C catalysts are commercially available) as well as potential savings compared to buying a pre-fabricated Pd, Re/C catalyst from a catalyst vendor 2) Catalysts deactivated during the process of hydrogenation of maleic acid to tetrahydrofuran and 1,4-butanediol can be regenerated by deposition of fresh rhenium onto the damaged catalyst under working conditions and the concentration of unreduced substrate and intermediates in the reactor ranging from near zero to working concentration. Removal from the reactor is not required. Also, the process can proceed without interruption during the regeneration, i.e. no expensive down time.

3) The catalytic activity of a rhenium-containing catalyst, most preferably a Pd or Ru, Re/carbon-supported hydrogenation catalyst, is enhanced by treatment of the catalyst in an aqueous slurry containing a source of soluble perrhenate, followed by further treatment of the catalyst slurry in a reducing atmosphere at elevated temperature and pressure prior to use to give a supported palladium or ruthenium, rhenium catalyst with the new rhenium being in the form of a highly dispersed phase.

4). Additional enhancement of the performance of fresh catalysts is possible by exposing the Pd, Re/C catalyst-HReO$_4$—H$_2$O slurry to flowing hydrogen at ambient temperatures and 2,000 psig (1.38×10$^7$ Pa) pressure for approx. 8 hours (low temperature activation) prior to raising the temperature to the "normal" elevated activation temperature.

DETAILED DESCRIPTION OF THE INVENTION

In its broadest aspect, this invention finds applicability in the treatment of any rhenium-containing catalyst wherein the rhenium component is deposited on a support material and the catalytic activity of the catalyst depends at least in part on the rhenium component being highly dispersed on the support. It is preferable that components other than rhenium (e.g. other metals or supports) present in the catalyst are not adversely affected by the conditions employed. The palladium component of the Pd, Re/C catalyst and the ruthenium component of the Ru, Re/C catalyst appear to be essentially inert to treatment conditions.

Preparation and use of a preferred Pd, Re/C hydrogenation catalyst is disclosed in U.S. Pat. No. 4,609,636, the full disclosure of which is incorporated by reference herein. Summarizing what is therein disclosed, the Pd, Re/C catalyst is prepared by impregnating a carbon support with palladium in solution, removing the solvent, heating under reducing conditions, impregnating with rhenium from solution, and heating the final catalyst under reducing conditions. Particularly preferred herein is a Pd, Re/C catalyst containing 1% Pd and 4% Re(w/w).

Preparation and use of a preferred Ru, Re/C hydrogenation catalyst is disclosed in U.S. Pat. No. 5,478,952, the full disclosure of which is incorporated by reference herein. Summarizing what is therein disclosed, the Ru, Re/C catalyst is prepared by either sequential depositing and reduction similar to the above Pd, Re/C catalyst or unlike the above by co-depositing and subsequent co-reduction of Ru and Re concurrently of the carbon support. Particularly preferred herein is a Ru, Re/C catalyst containing 1% Ru and 4 to 6% Re(w/w).

Carbon supports having a surface area, for example from a few 100 to nearly 2,000 m$^2$/g are particularly preferred, and are currently considered to benefit most from the treatment disclosed herein. An Example of a suitable and preferred support carbon is commercially available as Darco KB-B activated carbon (source: American Norit Company, Inc.; 420 AGMAC Avenue; Jacksonville, Fla. 32205). Darco KB-B is a powder, wood based, with nominal surface area of 1,500 m$^2$/g.

In a first embodiment of the invention, the treatment with soluble perrhenate is carried out when the fresh catalyst or catalyst precursor is charged to the reactor, by adding soluble perrhenate to the catalyst slurry. In the case of the Pd, Re/C catalyst used in the hydrogenation of maleic acid to tetrahydrofuran, the reactor is closed, purged with inert gas, then exposed to flowing hydrogen at 2,000 psig (1.38×10$^7$ Pa) with rapid agitation. The temperature is then raised to 200° C. prior to or concurrent with the introduction of the maleic acid feed stream. A 1% Pd, 4% Re/C catalyst prepared in the lab reactor by adding 4% Re as HReO$_4$ to an aqueous slurry containing the pre-reduced 1% Pd/C catalyst precursor gave approximately equivalent performance (in the hydrogenation of maleic acid to TiF) compared to a 1% Pd, 4% Re/C catalyst prepared ex situ; i.e. the same 1% Pd/C catalyst precursor as above was impregnated with aqueous HReO$_4$ and dried to approximately 60% solids prior to charging to the lab reactor and beginning the activation sequence. Pd, Re/C catalysts are proprietary items, not available as off-the-shelf commodities from commercial catalyst vendors. However, many varied Pd/C catalysts (varied Pd loading, loading techniques, carbon supports, etc.) are readily available. Thus, the capability of depositing Re in situ offers the catalyst user great flexibility in choice of Pd/C precursors of varying types, as well as a wide choice of suppliers. In an emergency situation, where a new catalyst charge might be needed as soon as possible, this flexibility might be very important. Additionally, there will probably be a cost advantage if HReO$_4$ is deposited in-situ onto an off-the-shelf Pd/C catalyst precursor, compared to purchase of the proprietary Pd, Re/C catalyst.

In a further embodiment of the invention, a deactivated Re containing catalyst is regenerated by treatment with soluble perrhenate. A "deactivated" catalyst will be understood to refer to either a wholly or partially deactivated catalyst. Over time, a Pd or Ru, Re/C catalyst tends to lose its catalytic activity in production of tetrahydrofuran, as evidenced by lower space/time yields (STY) of tetrahydrofuran or by decreased conversion of maleic acid. The loss of activity can be incremental, as typically occurs under normal operating conditions or catastrophic, which generally is caused by abnormal operating conditions (e.g. loss of hydrogen, failure of agitation, etc.). Treatment of the catalyst with soluble perrhenate as disclosed can restore the optimal level of catalyst activity previously observed. Furthermore, treatment of the catalyst with soluble perrhenate as disclosed can enhance the activity of the catalyst so that its activity is higher than was previously observed. Regeneration may be carried out in the hydrogenation reactor itself under working catalytic conditions (one of the most important and surprising aspects of the invention), with or without temporarily shutting off the incoming reactant feeds. Thus, there will be little or no downtime. The essentials of the procedure are as follows:

a). although we do not believe it necessary or even advantageous, the maleic acid feed may be shut off for a few hours beforehand under working conditions, so that the inventory of substrate and intermediates in the reactor liquid is decreased by continued hydrogenation at working temperature and pressure b). the desired quantity of $HReO_4$ solution is fed into the reactor. If step a was omitted, this will be concurrent with maleic acid feed, or alternately, the maleic acid feed may be interrupted just long enough to add the $HReO_4$ solution. The desired quantity of $HReO_4$ to be added is estimated from the following calculation:

wt $HReO_4$(units of choice) to be added=(X/Y)*0.01*Z*R, where

X=desired STY boost (STY units)
Y=measured incremental boost/wt % Re added=70 STY units/wt % Re
Z=wt catalyst in reactor (units of choice)
0.01 converts the wt percent to a decimal
R=(mol wt $HReO_4$)/(mol wt Re)

c). (optional) with maleic acid feed off, the reactor contents are hydrogenated for several hours at 250° C. in 2,000 psig ($1.38 \times 10^7$ Pa) flowing hydrogen d). resume feeding maleic acid In this embodiment for regeneration of spent catalyst when applied to a commercial scale hydrogenation reactor under working catalytic conditions (again without shutting off the incoming reactant feed) the desired quantity of $HReO_4$ (calculate according to the above) can be slowly metered into the operating hydrogenation reactor as a aqueous solution. The preferred rate of addition is determined by the observed rate of decay of catalyst activity. Thus for example, if sustaining constant STY is to be achieved just enough $HReO_4$ is added to off-set the rate of decay. Typically, slow continuous metering such as to achieve about 0.01 to 0.5 wt % increase in the relative amount of Re metal deposited on the catalyst support per 24 hours of $HReO_4$ addition is sufficient and preferred.

Other aspects of the invention include the following:

A one-vessel or one-pot process for the preparation of supported palladium, rhenium catalysts which comprises preparing a palladium-on-carbon catalyst or catalyst precursor under aqueous conditions, adding a source of soluble perrhenate, and reducing with hydrogen to yield a supported palladium, rhenium catalyst.

A single high pressure reaction vessel process for the preparation of supported palladium, rhenium catalysts which comprises charging a supported palladium catalyst or catalyst precursor and a soluble source of perrhenate to the reaction vessel which is then charged with water and hydrogen under pressure, and reducing with hydrogen to give a hydrogenation reaction mixture containing supported palladium, rhenium catalyst.

A single high pressure reaction vessel process for the regeneration of supported palladium, rhenium catalysts which comprises charging a soluble source of perrhenate to a hydrogenation reactor containing a deactivated supported catalyst, water and the hydrogenation substrate and/or product, and reducing with hydrogen to yield a hydrogenation reaction mixture containing a reactivated supported palladium, rhenium catalyst.

The performance of a fresh Pd, Re/C catalyst ($HReO_4$ predeposited but not reduced) or of a Pd/C precursor slurried with a soluble perrhenate (as in the instant invention) is enhanced further by exposing the catalyst slurry to flowing hydrogen at elevated pressure and "ambient" temperature (15 to 30° C.) for a period of approximately eight hours ("low-temperature-activation") prior to raising the temperature to the reactor's working temperature (250° C. in the case of hydrogenation of maleic acid to THF). It has been shown that Re is deposited from the solution onto the catalyst during the low temperature activation, and that some reduction of Re occurs during the low temperature activation. It is believed that low temperature activation deposits the Re in closer proximity to the Pd particles on the catalyst (compared to activation at elevated temperature), thus enhancing Pd, Re synergy, and benefiting catalyst performance.

Preferred embodiments of the invention will be illustrated by the following examples, which are intended as illustration and not as limitation.

The invention is illustrated in the following examples in connection with a process of preparing tetrahydrofuran and 1,4-butanediol by the hydrogenation of maleic acid in the presence of a Pd, Re/carbon supported catalyst. General Procedures and Equipment used for Examples:

Examples 1 and 2 were carried out in a back-mixed reactor by charging 7 to 15 g (dry basis) of catalyst slurry in 150 mL water into a 300 mL Hastalloy C autoclave equipped with an agitator, a thermocouple, feed lines for hydrogen and maleic acid, and an exit line through which the product was swept out with the excess hydrogen and water vapor. Preceding the reaction, the catalyst slurry was activated at 250° C. under a 1,000 mL/min hydrogen flow at 2,000 psig ($1.38 \times 10^7$ Pa) for one hour. Thereafter, maleic acid was fed as a 40% by weight aqueous solution at feed rates ranging from 18 to 36 mL/hr, and the reactor was maintained at 2,000 psig ($1.38 \times 10^7$ Pa) and 250° C. The volatile products and water were swept out of the reactor at a rate controlled by the hydrogen feed rate. The hydrogen feed rate was adjusted so that the amount of water carried out with the exiting hydrogen gas was balanced with the amount of water added with the maleic acid feed and the amount produced by the reaction. The reactor level was maintained constant at 100 to 200 mL. In all cases an excess of hydrogen was fed relative to the amount consumed by the reaction and accordingly, the hydrogen feed rate did not influence catalyst performance.

Several different feed rates of maleic acid were used in each catalyst test. The feed rate was increased from run to run until maximum STY performance was achieved. The reproducibility of the maximum STY performance was then checked over two or more runs under the same conditions.

EXAMPLE 1

$HReO_4$ Addition to Fresh Pd/C Catalyst:

The concept of addition of $HReO_4$ to a slurry of fresh Pd/C catalyst, followed by in-reactor deposition of the added Re onto the catalyst was demonstrated by charging 15 grams of a 1% Pd/C precursor to the reactor. The Pd/C precursor had been prepared previously as follows:

a). 3.15 cc of Pd stock solution (14.0% Pd as $PdCl_2$ in $HCl/H_2O$) was added to 127 cc of deionized water and mixed well.

b). To this mixture was added 50 grams of Darco KBB carbon and stirred occasionally for 3 hours at room temperature.

c). The slurry was dried overnight at 115° C. 38.63 Grams of product were recovered. (nominal Pd loading 1.1%).

d). The product was reduced in flowing $H_2$ at 300° C.

To the Pd/C precursor was added 75 mL of a water solution of KCl (0.28 g of KCl loading 1% K on the catalyst), stirred for 15 minutes at room temperature. To this was then added 75 mL of a Re solution containing sufficient perrhenic acid to give 4% Re loading on the catalyst. This was stirred for several minutes, the reactor was sealed up, and the catalyst activated as normal (i.e., 2,000 psig $H_2$ ($1.38 \times 10^7$ Pa) at 250° C. for 1 hour). The reaction run started up at the standard conditions (2,000 psig ($1.38 \times 10^7$ Pa), 250° C., 1,200 rpm, 1,800 cc/min $H_2$, 0.4 cc/min 40% MAC feed.; i.e., maleic acid feed). The remainder of the 5 day test followed the typical procedure employed in the back-mixed continuous laboratory reactor. The best performance achieved was 510 STY, averaged over 1 day's run. Mass balance was 122%.

By way of comparison, similar Pd, Re/C catalysts prepared on the same carbon support and with Pd deposited and reduced prior to $HReO_4$ deposition and Re predeposited (and in some cases reduced) before loading into the reactor is found to have a performance baseline of 440 STY (on average) when similarly activated. Thus it is clear from Example 1 that addition of $HReO_4$ to the fresh 1% Pd/C catalyst in the reactor, followed by reduction, has yielded a catalyst at least as good as similar catalysts where Re was deposited prior to loading into the reactor.

EXAMPLE 2

Reactivation of a Deactivated Catalyst:

A Pd, Re/C catalyst had been catastrophically deactivated during hydrogenation of maleic acid to THF in an earlier run, due to operational problems. The catalyst was recovered, water washed and dried, and then retested in the laboratory scale back-mixed slurry reactor, a 300 mL continuously stirred autoclave. The test in the laboratory reactor gave results confirming that the catalyst was nearly inactive, with a space time yield (STY) of approximately 40. Note that many other samples of the same fresh catalyst used in this run (the baseline catalyst) reproducibly exhibit performance of 400 to 450 STY in normal Laboratory reactor operation.

Characterization of the severely deactivated catalyst sample was very informative. Some loss of rhenium (up to 50%) was observed by X-ray fluorescence. Characterization (imaging and microanalysis) in the STEM (Scanning Transmission Electron Microscope) indicated the microstructure of the palladium particles appeared "fresh", i.e. closely resembling their microstructure in the fresh catalyst, or in a used-but-still-active catalyst sample. However much of the rhenium observed in the same STEM experiment was in the form of large aggregates, dramatically different from the highly dispersed Re microstructure observed both in the fresh catalyst as described in U.S. Pat. No. 4,609,636 and in a used, but not deactivated Pd, Re/C catalyst.

The following Aqueous Solutions were Prepared:

(a) Potassium chloride 0.28 g was dissolved in 75 mL water.

(b) 7.5 mL of an aqueous rhenium stock solution (8.00% Re as $HReO_4$) was added to 70 mL water.

A 15 g dried sample of the deactivated catalyst was charged to a 300 mL Hastalloy C autoclave equipped with an agitator, a thermocouple, feed lines for hydrogen and maleic acid, and an exit line through which the product THF would be distilled. The above potassium chloride aqueous solution (a.) was added to the autoclave and stirred for 15 minutes. The rhenium stock solution (b) was then added. The autoclave was closed. The catalyst was activated by heating to 250° C. in flowing hydrogen (2,000 psig ($1.38 \times 10^7$ Pa), 1,000 mL/minute), then holding at 250° C. for one hour. Maintaining the previous conditions, maleic acid was then fed to the autoclave as a 40% aqueous solution at a feed rate of 0.4 mL/minute. The organic products and water were distilled out of the reactor at a corresponding rate. The rate of product removal was controlled by the hydrogen feed rate. The reaction was run for about 12 hours each day, then restarted on the following day.

The following summarizes the results of the sequential five daily runs:

ON DAY 1. The above described procedure was followed. In contrast to an earlier test with this "dead" catalyst in which neither potassium (as KCl) nor rhenium (as $Re_2O_7$ in water) additions were made, the catalyst was clearly active this time giving an STY of THF of 155 with 64% yield of THF+GBL and 62% THF yield. The acid level was 3%, and the GBL was 6%. The mass balance was 86%. The reactor was subsequently found to have a major leak in the head gasket as shown by the final liquid level of only 50 mL vs. the inventory level of 240 mL.

ON DAY 2. After the head gasket leak had been repaired, the DAY 1 run was repeated using the same conditions. This time the STY was 255, with 83% yield of THF+GBL and 77% THF yield. The acid level was 2 to 3%, and the GBL was 5%. The mass balance was 78%.

ON DAY 3. The DAY 2 run was continued with the feed rate increased to 0.5 mL/minute. The STY increased to 380 with 89% yield of THF+GBL and 77% yield of THF. The acid content increased from 4 to 8% and the GBL to 16%. The mass balance was 116%.

ON DAY 4. The DAY 3 run was continued with a feed rate decrease to 0.4 mL/minute. The STY for the run increased to 385 with 89% yield of THF+GBL and 85% THF yield. The acid level was 7% and the GBL was 16%. The mass balance was 130%.

ON DAY 5. The DAY 4 run was continued without change of flow rates or conditions. The STY was 340 with 90% yield of THF+GBL. THF yield was 83%. The acid level was 10 to 5% and the GBL was 20 to 12% with both of the lower values pertaining to the end of the run. The mass balance was 105%. The run was stopped, the catalyst was recovered from the reaction mixture by filtration, followed by washing in water. 13.1 Grams of catalyst were recovered.

This Example clearly confirms the novel ability to reactivate the deactivated catalyst by addition of aqueous KCl and $HReO_4$ in situ in the pressure vessel with hydrogen at 2,000 psig ($1.38 \times 10^7$ Pa) and 250° C. The best estimate of the performance of the regenerated catalyst, as measured in the above test, is 380 STY, with a mass balance of 116%, both averaged over a day's run.

EXAMPLE 3

Low Temperature Activation of a Fresh Catalyst:

23 g (10 g dry basis) of a 1% Pd, 4% Re/C catalyst (the standard baseline catalyst cited in an earlier example) was loaded into the back mixed lab slurry reactor. 100 cc water was added. The reactor was next pressurized with 2,000 psig (1.38×10$^7$ Pa) H$_2$. This static atmosphere was maintained over the next 18 hours in order to check the reactor's gas leak rate. Then the standard activation sequence was begun. The hydrogen flow rate was increased from 0 to 300 cc/min, still maintaining the pressure at 2,000 psig (1.38×10$^7$ Pa). The mixture was agitated at 1,200 rpm. The reactor temperature was increased from room temperature to 250° C. over the next 45 minutes. These conditions (250° C., 2,000 psig (1.38×10$^7$ Pa) flowing H$_2$) were maintained for the next hour. Then the maleic acid feed was turned on, and a standard catalyst performance test was begun. The best measure of the catalyst's performance recorded during this 6 day test was a 585 STY, averaged over a day's run. The mass balance for that day was 114%. STYs as high as 645 were measured, but the mass balance was ca. 130%. 585 STY is a conservative measure of the catalyst's performance.

COMPARATIVE EXAMPLE
Standard Activation of a Fresh Catalyst:

34.5 g (15 g dry basis) of a 1% Pd, 4% Re/C catalyst (the standard baseline catalyst used in Example 3) was loaded into the back mixed lab slurry reactor. 150 cc water was added. The reactor was next pressurized with 2,000 psig (1.38×10$^7$ Pa) H$_2$. The static pressure test under 2,000 psig (1.38×10$^7$ Pa) H$_2$ was much briefer, approximately 1 hour. Then the standard activation sequence was begun. The hydrogen flow rate was increased from 0 to 300 cc/min, still maintaining the pressure at 2,000 psig (1.38×10$^7$ Pa). The mixture was agitated at 1,200 rpm. The reactor temperature was increased from room to 250° C. over the next 45 minutes. These conditions (250° C., 2,000 psig (1.38×10$^7$ Pa) flowing H$_2$) were maintained for the next hour. Then the maleic acid feed was turned on, and a standard catalyst performance test was begun. The best measure of the catalyst's performance recorded during this 7 day test was a 450 STY, averaged over a 12 hour run. The mass balance for that day was 89%. The performance measured in this comparative run is very close to the average value of many standard runs with this baseline catalyst. Thus, it is clear that the superior performance exhibited by the catalyst of Example 3 is due to the benefits of low temperature activation.

EXAMPLE 4

A continuous run was carried out in a back-mixed slurry reactor by charging 3.5 g of a 1% Ru, 4% Re on carbon catalyst in 150 mL water into a 300 mL Hastelloy C autoclave equipped with an agitator, a thermocouple, feed lines for hydrogen and maleic acid, and an exit line through which the product was swept out with the excess hydrogen and water vapor. Preceding the reaction, the catalyst slurry was activated at 250° C. under a 1,000 mL/min hydrogen flow at 2,000 psig (1.38×10$^7$ Pa) for one hour. Thereafter, maleic acid was fed as a 40% by weight aqueous solution at various feed rates, and the reactor was maintained at 2,000 psig and 250° C. The volatile products and water were swept out of the reactor at a rate controlled by the hydrogen feed rate. The hydrogen feed rate was adjusted so that the amount of water carried out with the exiting hydrogen gas was balanced with the amount of water added with the maleic acid feed and the amount produced by the reaction. The reactor level was maintained constant at 100 to 200 cc. In all cases an excess of hydrogen was fed relative to the amount consumed by the reaction, and the hydrogen feed rate was shown not to influence catalyst performance.

The maleic acid solution was fed at a low initial feed rate and was increased by 2 to 3 cc/hr about every 8 hours until the acid level in the reactor reached 8%. After this the maleic acid feed rate was adjusted as necessary to maintain the reactor acid level between 6 to 10%.

The run was made without interruption for ten weeks, and time intervals during steady state operation were selected for analysis, generally of 8 to 24 hour duration. The product composition data generated during steady state operation was averaged to give the average production rates (g/hr) of THF (tetrahydrofuran), BDO (1,4-butanediol), GBL (gamma butyrolactone), PrOH (n-propyl alcohol), BuOH (n-butyl alcohol), and alkanes (primarily butane and methane). The product composition was measured by condensing a portion of the volatilized products and water in the exit gas stream and collecting the liquid product. The volume of the liquid product collected each hour was measured, and its composition analyzed using a calibrated gas chromatograph (GC) equipped with a flame ionization detector. The remaining uncondensed products (THF and alkanes) still in the exit gas stream were analyzed by measuring the gas flow rate, then analyzing the composition of the gas stream every two hours using GC procedures similar to those used for liquid analysis. The reactor contents were sampled every four hours and analyzed by GC and titration. Titration with sodium hydroxide was used to monitor the acid concentration in the reactor and the results are reported as % by weight of succinic acid. The GC analysis was carried out using a Supelcowax 10 capillary column (30 m×0.052 mm) which was maintained at 75° C. for 5 minutes after injection on and then heated at 10° C. per minute to a final temperature of 200° C. The combination of these three analyses permits calculation of the catalyst performance in terms of space time yield (STY) (calculated as g THF/Kg catalyst-hr), product selectivity, and the mass balance for each run.

At the beginning of the run the catalyst had sufficient activity to produce THF at a 1,000 STY rate. Later in the run, after the catalyst had lost some of its initial activity, it was producing THF at a 550 STY rate. At this point, the reactor was shut down and sufficient perrhenic acid was added to the reactor to give an extra 2% Re on the catalyst. When the reactor was started back up the catalyst was found to have sufficient activity to produce THF at a 760 STY rate.

EXAMPLE 5

6.5 g of a 1% Ru, 6% Re/C catalyst was tested in a one inch ID by 40 inch long continuous bubble column reactor at 250° C. and 2,000 Psig (1.38×10$^7$ Pa). The feeds at the reactor bottom consisted of about 25 cc/hr of 40% aqueous maleic acid (MAC) solution and 1,000 Std. cc/min of H$_2$. At 112 hours the THF STY (g of THF/hr-Kg of catalyst) was about 600 and at 248 hours the THF STY was 450. During the 112 to 248 hours-interval, the THF STY declined at the approximately linear rate of about 26 STY/day. From 248 to 304 hours the feed was substituted by a 40% MAC solution containing 0.044 g/L of Re as Re$_2$O$^7$. After hour 304 the feed solution was restored to the normal 40% MAC solution and at hour 312, the THF STY was 577. The rate of Re addition rate was about 0.41% (of the catalyst mass)/day (i.e., 0.044 g/L×0.025 L/hr×24 hr/day/6.5 g of catalyst×100). Without the Re addition, the THF STY at hour 312 is estimated to have dropped to about 375 (by extrapolating the THF STY using the measured THF STY decline rate of 26/day). Thus, the THF STY increase due to the 1.08% Re added in the 248 to 304 hours-interval was about 202 THF STY (i.e., 577–375), which represents a THF STY increase of about 187 per 1% Re added.

EXAMPLE 6

6.5 g of a 1% Ru, 4% Re/C catalyst was tested in the same apparatus and at the same conditions as in Example 5. At 48 hours the THF STY (g of THF/hr-Kg of catalyst) was about 491 and at 144 hours the THF STY was 424. During the 48 to 144 hours-interval, the THF STY declined at the rate of about 17/day at an approximately linear fashion. At 160 hours, the MAC feed was turned off and a lump Re addition (as $Re_2O_7$) of 2% of the mass of catalyst in the reactor was made in about 15 min. After the Re addition, the MAC feed was restarted so that at hour 192, the THF STY was 425. Without the Re addition, the THF STY at hour 192 is estimated to have dropped to about 390 (by extrapolating the THF STY using the measured THF STY decline rate of 17/day). Thus, the THF STY increase due to the 2% Re added instantaneously was about 35 THF STY (i.e., 425–390), which represents a THF STY increase of about 18 per 1% Re added. Therefore, by comparing Examples 5 and 6, one concludes that slow Re addition done continuously produces a much bigger increase of THF STY per %Re added than lump or instantaneous Re addition. Another advantage of the continuous Re addition is that it can be done without stopping the MAC feed (so the production process continues simultaneously with the catalyst regeneration process).

Having thus described and exemplified the invention with a certain degree of particularity, it should be appreciated that the following claims are not to be so limited but are to be afforded a scope commensurate with the wording of each element of the claim and equivalents thereof.

We claim:

1. A process for regeneration of a deactivated carbon-supported, rhenium-containing catalyst used to hydrogenate maleic acid to tetrahydrofuran in an aqueous media comprising the step of adding a water soluble rhenium compound to the working hydrogenation reactor.

2. A process of claim 1 wherein said water soluble rhenium compound is added in small quantities over the duration of the use of the catalyst to enhance the relative catalytic effect per unit soluble rhenium added.

3. A process of claim 1 wherein said water soluble rhenium compound is selected from the group consisting of perrhenic acid, potassium perrhenate and mixtures thereof.

4. A process of claim 1 wherein said rhenium-containing catalyst is selected from the group consisting of palladium, rhenium-on-carbon supported catalyst or ruthenium, rhenium-on-carbon supported catalyst.

5. A process for inhibiting deactivation and sustaining catalyst activity of a carbon-supported, rhenium-containing catalyst used to hydrogenate maleic acid to tetrahydrofuran in an aqueous media comprising the step of adding a water soluble rhenium compound to the working hydrogenation reactor.

6. A process of claim 5 wherein said water soluble rhenium compound is added in small quantities over the duration of the use of the catalyst to enhance the relative catalytic effect per unit soluble rhenium added.

7. A process for preparing palladium, rhenium-on-carbon catalyst or ruthenium, rhenium-on-carbon catalyst in an aqueous media comprising the steps of: adding a water soluble rhenium compound to a palladium-on-carbon support catalyst or ruthenium-on-carbon support catalyst in a pressure vessel reactor under ambient conditions followed by purging the reactor of air to remove all gases except hydrogen, then staring hydrogen flow and heating the reactor to approximately 150 to 300° C. at 1,000 to 3,000 psig ($6.89 \times 10^6$ to $2.17 \times 10^7$ Pa) for 0.5 to 3.0 hours before starting maleic acid feed to the reactor.

8. A process of claim 7 wherein said water soluble rhenium compound is added in small quantities over the duration of the adding step to enhance the relative catalytic effect per unit soluble rhenium added.

9. An aqueous process for the hydorgenation of maleic acid using rhenium metal onto carbon supported palladium catalysts, ruthenium catalyst or catalyst precursors thereof comprising the steps of:
   (a) adding a water soluble rhenium compound consisting of perrhenic acid, potassium perrhenate, or mixture thereof to a pressure vessel containing said carbon supported palladium catalysts, ruthenium catalyst or catalyst precursors under ambient conditions;
   (b) purging and pressurizing the reactor with hydrogen at ambient temperature and 1,000 to 3,000 psig ($6.89 \times 10^6$ to $2.17 \times 10^7$ Pa) hydrogen for up to 8 hours;
   (c) starting hydrogen flow while heating the reactor to 150 to 300° C. at 1,000 to 3,000 psig ($6.89 \times 10^6$ to $2.17 \times 10^7$ Pa) for 0.5 to 3.0 hours before starting maleic acid feed to the reactor; and
   (d) recovering an aqueous stream of tetrahydrofuran as product at a rate controlled by the rate of maleic acid fed to the reactor.

10. A process of claim 9 wherein said water soluble rhenium compound is added in small quantities over the duration of the adding step (a) to enhance the relative catalytic effect per unit soluble rhenium added.

* * * * *